United States Patent
Kim et al.

(10) Patent No.: US 12,519,562 B2
(45) Date of Patent: Jan. 6, 2026

(54) SIGNAL TRANSMISSION/RECEPTION METHOD AND DEVICE USING CONCATENATED POLAR CODES BASED ON ALGEBRAIC CODE

(71) Applicants: LG ELECTRONICS INC., Seoul (KR); KOREA ADVANCED INSTITUTE OF SCIENCE AND TECHNOLOGY, Daejeon (KR)

(72) Inventors: Bonghoe Kim, Seoul (KR); Jeongseok Ha, Daejeon (KR); Kyungmok Oh, Daejeon (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 50 days.

(21) Appl. No.: 18/710,023

(22) PCT Filed: Nov. 17, 2021

(86) PCT No.: PCT/KR2021/016866
§ 371 (c)(1),
(2) Date: May 14, 2024

(87) PCT Pub. No.: WO2023/090473
PCT Pub. Date: May 25, 2023

(65) Prior Publication Data
US 2025/0015922 A1    Jan. 9, 2025

(51) Int. Cl.
*H04L 1/00* (2006.01)

(52) U.S. Cl.
CPC .......... *H04L 1/0041* (2013.01); *H04L 1/0057* (2013.01); *H04L 1/0064* (2013.01); *H04L 1/0067* (2013.01)

(58) Field of Classification Search
CPC ... H04L 1/0041; H04L 1/0057; H04L 1/0064; H04L 1/0067; H03M 13/13;
(Continued)

(56) References Cited

U.S. PATENT DOCUMENTS

2020/0052718 A1* 2/2020 Prinz .................. H03M 13/1148
2020/0177211 A1* 6/2020 Fazeli Chaghooshi ......................
H03M 13/2933

FOREIGN PATENT DOCUMENTS

| JP | 2020-527297 | 9/2020 |
|---|---|---|
| KR | 10-1891093 | 8/2018 |

(Continued)

OTHER PUBLICATIONS

Genc et al., Fast calculation of Polar Code bits and frozen bit locations, Journal of Science & Engineering, Oct. 6, pp. 125-132. (Year: 2021).*

(Continued)

Primary Examiner — Shelly A Chase
(74) Attorney, Agent, or Firm — LEE, HONG, DEGERMAN, KANG & WAIMEY

(57) ABSTRACT

The present invention relates to a method by which a device transmits a signal in a communication system and the device for same, and to a method and a device for same, the method comprising the steps of: applying a pre-code to an information bit sequence so as to generate a first encoded bit sequence including an information set, a frozen set, and a parity set; additionally changing some of the information sets of the first encoded bit sequence into the frozen set and the parity set so as to generate a second encoded bit sequence corresponding to the first encoded bit sequence; applying a polar code to the second encoded bit sequence so as to generate a third encoded bit sequence; and transmitting the third encoded bit sequence.

20 Claims, 21 Drawing Sheets

(58) Field of Classification Search
CPC ............. H03M 13/29; H03M 13/2903; H03M 13/2906; H03M 13/2957
See application file for complete search history.

(56) References Cited

FOREIGN PATENT DOCUMENTS

| KR | 10-2019-0114263 | 10/2019 |
| --- | --- | --- |
| KR | 10-2019-0138682 | 12/2019 |
| KR | 10-2021-0002817 | 1/2021 |

OTHER PUBLICATIONS

PCT International Application No. PCT/KR2021/016866, Written Opinion and International Search Report dated Jul. 12, 2022, 6 pages.

\* cited by examiner (a)                          (b)

(a)

(b)

SIGNAL TRANSMISSION/RECEPTION METHOD AND DEVICE USING CONCATENATED POLAR CODES BASED ON ALGEBRAIC CODE

CROSS-REFERENCE TO RELATED APPLICATION(S)

This application is the National Stage filing under 35 U.S.C. 371 of International Application No. PCT/KR2021/016866, filed on Nov. 17, 2021, the contents of which is hereby incorporated by reference herein in its entirety.

TECHNICAL FIELD

The present disclosure relates to a communication system, and to a method and device for transmitting and receiving a signal. More particularly, the present disclosure relates to signal transmission and reception using an algebraic code-based concatenated polar code and a device using the same.

BACKGROUND

A polar code has performance that reaches a limit of information transmission efficiency when the length of the polar code is infinitely large, but when the length of the polar code is finite, the performance is low compared with that of the existing low density parity check code (LDPC) or turbo code. To overcome this, research has been conducted using list successive cancellation (LSC) decoding technology and code concatenation technology. In particular, a dramatic improvement in error correction capability has been observed through concatenation of polar codes and cyclic redundancy check (CRC) codes. However, it is difficult to analyze the algebraic characteristics of CRC concatenation polar codes. A combination of optimal CRC codes changes depending on a length of the code and a code rate, and a mathematical analysis method for finding an optimal CRC code is not known, and thus a long time is taken in a process of finding the optimal CRC code. It is impossible to determine whether the corresponding CRC code is an optimal concatenated code, and thus there may be a concatenated code having higher error correction performance than the CRC code. It is easy to analyze the algebraic characteristics of algebraic codes such as minimum distance $d_{min}$ or minimum distance code $A_{d_{min}}$, but efficient soft decoding methods are often unknown. When an algebraic code is reinterpreted as a concatenated code with a polar code, efficient soft decoding is possible using an LSC decoding algorithm used in a polar code. However, in a practical LSC decoder with a list size of about 8 to about 32, the code design result needs to apply the channel characteristics to have high performance, but the algebra-based code does not apply channel characteristics, and thus it is not possible to ensure high performance.

SUMMARY

An object of the present disclosure is to provide a method of improving the performance of a polar code, a method of transmitting and receiving a signal using the method, and device therefor.

The objects to implement in embodiments are not limited to the technical objects described above and other objects that are not stated herein will be clearly understood by those skilled in the art from the following specifications.

According to a first aspect of the present disclosure, a method of transmitting a signal by a transmission device in a communication system includes generating a first encoded bit sequence including an information set, a frozen set, and a parity set by applying a pre-code to an information bit sequence, generating a second encoded bit sequence corresponding to the first encoded bit sequence by further changing a portion of the information set of the first encoded bit sequence to the frozen set and the parity set, generating a third encoded bit sequence by applying a polar code to the second encoded bit sequence, and transmitting the third encoded bit sequence.

According to a second aspect of the present disclosure, provided is a transmission device in a communication system includes at least one radio frequency unit, at least one processor, and at least one computer memory operatively connected to the at least one processor and configured to when executed cause the at least one processor to perform an operation, the operation including generating a first encoded bit sequence including an information set, a frozen set, and a parity set by applying a pre-code to an information bit sequence, generating a second encoded bit sequence corresponding to the first encoded bit sequence by further changing a portion of the information set of the first encoded bit sequence to the frozen set and the parity set, generating a third encoded bit sequence by applying a polar code to the second encoded bit sequence, and transmitting the third encoded bit sequence According to a third aspect of the present disclosure, an apparatus used in a transmission device includes at least one processor, and at least one computer memory operatively connected to the at least one processor and configured to when executed cause the at least one processor to perform an operation, wherein the operation includes generating a first encoded bit sequence including an information set, a frozen set, and a parity set by applying a pre-code to an information bit sequence, generating a second encoded bit sequence corresponding to the first encoded bit sequence by further changing a portion of the information set of the first encoded bit sequence to the frozen set and the parity set, generating a third encoded bit sequence by applying a polar code to the second encoded bit sequence, and transmitting the third encoded bit sequence.

According to a fourth aspect of the present disclosure, provided is a computer-readable storage medium including at least one computer program that when executed causes at least one processor to perform an operation, the operation including generating a first encoded bit sequence including an information set, a frozen set, and a parity set by applying a pre-code to an information bit sequence, generating a second encoded bit sequence corresponding to the first encoded bit sequence by further changing a portion of the information set of the first encoded bit sequence to the frozen set and the parity set, generating a third encoded bit sequence by applying a polar code to the second encoded bit sequence, and transmitting the third encoded bit sequence.

The pre-code and the polar code may each be a portion of a concatenated code.

The concatenated code may have a first code rate, and the first code rate may be greater than a target code rate for the information bit sequence The sizes of the frozen set and the parity set may satisfy following:

Frozen set: $n_f = r1*(R^{(t)}-R)*N$

Parity set: $n_p = r2*(R^{(t)}-R)*N$ r1 and r2 are values between 0 and 1, r1+r2 is 1, $R^{(t)}$ is the first code rate, R is the second code rate, and N is a code length of the polar code.

Based on the code length of the polar code being 256, the second encoded bit sequence may include a following structure:

| | Bit location |
|---|---|
| Information set | 16, 24, 28, 30, 31, 32, 40, 44, 46, 47, 48, 52, 54, 55, 56, 57, 58, 59, 60, 61, 62, 63, 64, 72, 76, 78, 79, 80, 84, 85, 86, 87, 88, 89, 90, 91, 92, 93, 94, 95, 96, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 136, 139, 140, 141, 142, 143, 144, 146, 147, 148, 149, 150, 151, 152, 153, 154, 155, 156, 157, 158, 159, 160, 162, 163, 164, 165, 166, 167, 168, 170, 171, 172, 173, 174, 175, 176, 178, 179, 180, 181, 182, 183, 184, 185, 186, 187, 188, 189, 190, 191, 192, 196, 198, 199, 200, 202, 203, 204, 205, 206, 207, 208, 210, 211, 212, 213, 214, 215, 216, 217, 218, 219, 220, 221, 222, 223, 224, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256 |
| Frozen set | 1, 2, 3, 4, 5, 6, 7, 8, 9, 10, 11, 12, 13, 14, 15, 17, 18, 19, 20, 21, 22, 23, 25, 26, 27, 29, 33, 34, 35, 36, 37, 38, 39, 41, 42, 43, 49, 65, 66, 67, 68, 69, 70, 73, 81, 97, 129, 130, 131, 133, 137, 145, 161, 193 |
| Parity set | 45, 50, 51, 53, 71, 74, 75, 77, 82, 83, 132, 134, 135, 138, 169, 177, 194, 195, 197, 201, 209, 225 |

According to embodiment(s) of the present disclosure, the performance of polar codes may be improved. A method and device using the same may be provided.

It will be appreciated by those of skill in the art that the effects that could be achieved with the present disclosure are not limited to what has been particularly described hereinabove and other advantages of the present disclosure will be more clearly understood from the above detailed description.

BRIEF DESCRIPTION OF THE DRAWINGS

The accompanying drawings, which are included to provide a further understanding of the disclosure, illustrate examples of the disclosure and together with the description serve to explain the principle of the disclosure.

DETAILED DESCRIPTION

Figure 1:
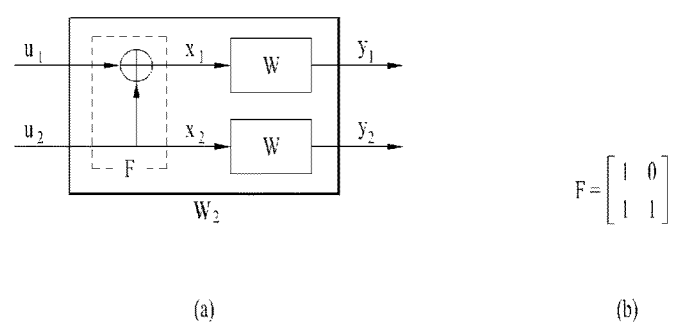
FIG. 1 illustrates an internal structure of a circular buffer.

Reference will now be made in detail to the exemplary examples of the present disclosure, examples of which are illustrated in the accompanying drawings. The detailed description, which will be given below with reference to the accompanying drawings, is intended to explain exemplary examples of the present disclosure, rather than to show the only examples that can be implemented according to the disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present disclosure is applied to 3GPP based communication system, e.g. LTE/LTE-A, NR. However, the technical features of the present disclosure are not limited thereto. For example, although the following detailed description is given based on a mobile communication system corresponding to a 3GPP LTE/LTE-A/NR system, aspects of the present disclosure that are not specific to 3GPP LTE/LTE-A/NR are applicable to other mobile communication systems.

In examples of the present disclosure described below, the expression that a device "assumes" may mean that a subject which transmits a channel transmits the channel in accordance with the corresponding "assumption". This may also mean that a subject which receives the channel receives or decodes the channel in a form conforming to the "assumption", on the assumption that the channel has been transmitted according to the "assumption".

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as an gNB. Herein, for convenience of description, a base station will be referred to as a BS regardless of type or version of communication technology.

In the present disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may mean a physical antenna or mean an antenna port, a virtual antenna or antenna group. A node may also be referred to as a point.

In the present disclosure, a cell refers to a prescribed geographical area to which one or more nodes provide a communication service. Accordingly, in the present disclosure, communicating with a specific cell may mean communicating with a BS or a node which provides a communication service to the specific cell. In addition, a DL/UL signal of a specific cell refers to a DL/UL signal from/to a BS or a node which provides a communication service to the specific cell. Anode providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a BS or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency may be the same as a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP based communication standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present disclosure, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present disclosure, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a BS is conceptually identical to downlink data/DCI transmission on PDCCH/PCFICH/PHICH/PDSCH, respectively.

For terms and technologies which are not described in detail in the present disclosure, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP TS 38.213, 3GPP TS 38.214, 3GPP TS 38.300 and 3GPP TS 38.331. In addition, as to polar codes and the principle of encoding and decoding using the polar codes, reference may be made to 'E. Arikan, "Channel Polarization: A Method for Constructing Capacity-Achieving Codes for Symmetric Binary-Input Memoryless Channels," in IEEE Transactions on Information Theory, vol. 55, no. 7, pp. 3051-3073, July 2009'.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present disclosure, the corresponding technology is referred to as a new RAT (NR) or 5G RAT, for convenience.

NR provides higher speeds and better coverage than current 4G. NR operates in a high frequency band and is required to offer speeds of up to 1 Gb/s for tens of connections or tens of Mb/s for tens of thousands of connections. To meet requirements of such an NR system, introduction of a more evolved coding scheme than a legacy coding scheme is under discussion. Since data communication arises in an incomplete channel environment, channel coding plays an important role in achieving a higher data rate for fast and error-free communication. A selected channel code needs to provide superior block error ratio (BLER) performance for block lengths and code rates of a specific range. Herein, BLER is defined as the ratio of the number of erroneous received blocks to the total number of sent blocks. In NR, low calculation complexity, low latency, low cost, and higher flexibility are demanded for a coding scheme. Furthermore, reduced energy per bit and improved region efficiency are needed to support a higher data rate. Use examples for NR networks are enhanced mobile broadband (eMBB), massive Internet of things (IoT), and ultra-reliable and low latency communication (URLLC). eMBB covers Internet access with high data rates to enable rich media applications, cloud storage and applications, and augmented reality for entertainment. Massive IoT applications include dense sensor networks for smart homes/buildings, remote health monitoring, and logistics tracking. URLLC covers critical applications that demand ultra-high reliability and low latency, such as industrial automation, driverless vehicles, remote surgery, and smart grids.

Although many coding schemes with high capacity performance at large block lengths are available, many of these coding schemes do not consistently exhibit excellent good performance in a wide range of block lengths and code rates. However, turbo codes, low-density parity check (LPDC) codes, and polar codes show promising BLER performance in a wide range of coding rates and code lengths and hence are considered to be used in the NR system. As demand for various cases such as eMBB, massive IoT, and URLLC has increased, a coding scheme providing greater channel coding efficiency than in turbo codes is needed. In addition, increase in a maximum number of subscribers capable of being accommodated by a channel, i.e., increase in capacity, has been required.

Polar codes are codes providing a new framework capable of solving problems of legacy channel codes and were invented by Ankan at Bilkent University (reference: E. Arikan, "Channel Polarization: A Method for Constructing Capacity-Achieving Codes for Symmetric Binary-Input Memoryless Channels," in IEEE Transactions on Information Theory, vol. 55, no. 7, pp. 3051-3073, July 2009). Polar codes are the first capacity-achieving codes with low encoding and decoding complexities, which were proven mathematically. Polar codes outperform the turbo codes in large block lengths while no error flow is present. Hereinafter, channel coding using the polar codes is referred to as polar coding.

Polar codes are known as codes capable of achieving the capacity of a given binary discrete memoryless channel. This can be achieved only when a block size is sufficiently large. That is, polar codes are codes capable of achieving the capacity of a channel if the size N of the codes infinitely increases. Polar codes have low encoding and decoding complexity and may be successfully decoded. Polar codes are a sort of linear block error correction codes. Multiple recursive concatenations are basic building blocks for the polar codes and are bases for code construction. Physical conversion of channels in which physical channels are converted into virtual channels occurs and such conversion is based on a plurality of recursive concatenations. If multiple channels are multiplied and accumulated, most of the channels may become better or worse. The idea underlying polar codes is to use good channels. For example, data is sent through good channels at rate 1 and data is sent through bad channels at rate 0. That is, through channel polarization, channels enter a polarized state from a normal state.

FIG. 1 is a block diagram for a polar code encoder.

FIG. 1(a) illustrates a base module of a polar code, particularly, first level channel combining for polar coding. In FIG. 4(a), $W_2$ denotes an entire equivalent channel obtained by combining two binary-input discrete memoryless channels (B-DMCs), Ws. Herein, $u_1$ and $u_2$ are binary-input source bits and $y_1$ and $y_2$ are output coded bits. Channel combining is a procedure of concatenating the B-DMCs in parallel.

FIG. 1(b) illustrates a base matrix F for the base module. The binary-input source bits $u_1$ and $u_2$ input to the base matrix F and the output coded bits $x_1$ and $x_2$ of the base matrix F have the following relationship.

$$[u_1 u_2]\begin{bmatrix} 1 & 0 \\ 1 & 1 \end{bmatrix} = [x_1 x_2] \qquad \text{Equation 1}$$

The channel $W_2$ may achieve symmetric capacity I(W) which is a highest rate. In the B-DMC W, symmetric capacity is an important parameter which is used to measure a rate and is a highest rate at which reliable communication can occur over the channel W. The B-DMC may be defined as follows.

$$I(W) = \sum_{y \in Y} \sum_{x \in X} \frac{1}{2} W(y|x) \log \frac{w(y|x)}{\frac{1}{2} w(y|0) + \frac{1}{2} w(y|1)} \qquad \text{Equation 2}$$

It is possible to synthesize or create a second set of N binary input channels out of N independent copies of a given B-DMC W and the channels have the properties $\{W_N^{(i)}: 1 \leq i \leq N\}$. If N increases, there is a tendency for a part of the channels to have capacity approximating to 1 and for the remaining channels to have capacity approximating to 0. This is called channel polarization. In other words, channel polarization is a process of creating a second set of N channels $\{W_N^{(i)}: 1 \leq i \leq N\}$ using N independent copies of a given B-DMC W. The effect of channel polarization means that, when N increases, all symmetric capacity terms $\{I(W_N^{(i)})\}$ tend towards 0 or 1 for all except a vanishing fraction of indexes i. In other words, the concept behind channel polarization in the polar codes is transforming N copies (i.e., N transmissions) of a channel having a symmetric capacity of I(W) (e.g., additive white Gaussian noise channel) into extreme channels of capacity close to 1 or 0. Among the N channels, an I(W) fraction will be perfect channels and an 1−I(W) fraction will be completely noise channels. Then, information bits are transmitted only through good channels and bits input to the other channels are frozen to 1 or 0. The amount of channel polarization increases along with a block length. Channel polarization consists of two phases: channel combining phase and channel splitting phase.

Figure 2:
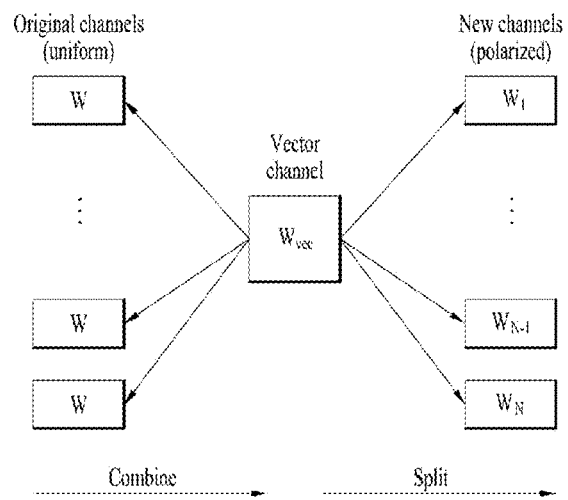
FIG. 2 is a block diagram for a polar code encoder.
Figure 2:
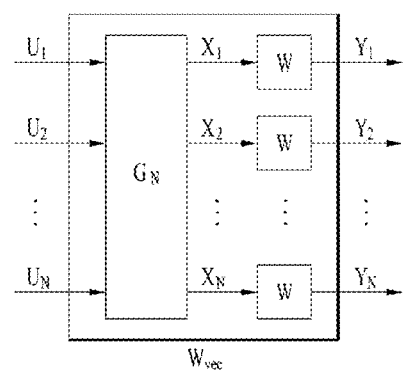
Figure 5:
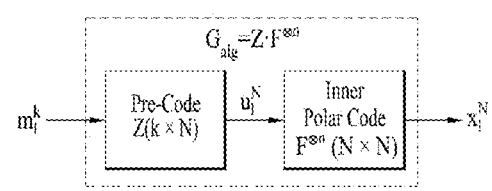
FIG. 5 illustrates an algebraic code-based concatenated polar code.

FIG. 2 illustrates the concept of channel combining and channel splitting for channel polarization. As illustrated in FIG. 5, when N copies of an original channel W are properly combined to create a vector channel $W_{vec}$ and then are split into new polarized channels, the new polarized channels are categorized into channels having capacity C(W)=1 and channels having C(W)=0 if N is sufficiently large. In this case, since bits passing through the channels having the channel capacity C(W))=1 are transmitted without error, it is better to transmit information bits therethrough and, since bits passing through the channels having capacity C(W)=0 cannot transport information, it is better to transport frozen bits, which are meaningless bits, therethrough.

Referring to FIG. 2, copies of a given B-DMC W are combined in a recursive manner to output a vector channel $W_{vec}$ given by $X_N \to Y_N$, where $N=2^n$ and n is an integer equal to or greater than 0. Recursion always begins at the 0th level and $W_1$=W. If n is 1 (n=1), this means the first level of recursion in which two independent copies of $W_1$ are combined. If the above two copies are combined, a channel $W_2$: $X_2 \to Y_2$ is obtained. A transitional probability of this new channel $W_2$ may be represented by the following equation.

$$W_2(y_1, y_2|u_1, u_2) = W(y_1|u_1 \oplus u_2)W(y_1|u_2) \qquad \text{Equation 3}$$

If the channel $W_2$ is obtained, two copies of the channel $W_2$ are combined to obtain a single copy of a channel $W_4$. Such recursion may be represented by $W_4$: $X_4 \to Y_4$ having the following transitional probability.

$$W_4(y_1^4|u_1^4) = W_2(y_1^2|u_1 \oplus u_2, u_3 \oplus u_4)W_2(y_3^4|u_2, u_4) \qquad \text{Equation 4}$$

In FIG. 2, $G_N$ is a size-N generator matrix. $G_2$ corresponds to the base matrix F illustrated in FIG. 4(b). $G_4$ may be represented by the following matrix.

$$G_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} 1 & 0 \\ 1 & 1 \end{bmatrix}^{\otimes 2} = \begin{bmatrix} 1 & 0 & 0 & 0 \\ 1 & 0 & 1 & 0 \\ 1 & 1 & 0 & 0 \\ 1 & 1 & 1 & 1 \end{bmatrix} \qquad \text{Equation 5}$$

Herein, $\otimes$ denotes the Kronecker product, $A^{\otimes n}=A \otimes A^{\otimes(n-1)}$ for all $n \geq 1$, and $A^{\otimes 0}=1$.

The relationship between input $u_1^N$ to $G_N$ and output $x_1^N$ of $G_N$ of FIG. 2(b) may be represented as $x_1^N = u_1^N G^N$, where $x_1^N = \{x_1, \ldots, x_N\}$, $u_1^N = \{u_1, \ldots, u_N\}$ When N B-DMCs are combined, each B-DMC may be expressed in a recursive manner. That is, $G_N$ may be indicated by the following equation.

$$G_N = B_N F^{\otimes n} \qquad \text{Equation 6}$$

Herein, $N=2^n$, $n \geq 1$, $F^{\otimes n}=F \otimes F^{\otimes(n-1)}$, and $F^{\otimes 0}=1$. $B_N$ is a permutation matrix known as a bit-reversal operation and $B_N=R_N(I_2 \otimes B_{N/2})$ and may be recursively computed. $I_2$ is a 2-dimensional identity matrix and this recursion is initialized to $B_2=I_2$. $R_N$ is a bit-reversal interleaver and is used to map an input $s_1^N=\{s_1, \ldots, s_N\}$ to an output $x_1^N=\{s_1, s_3, \ldots, s_{N-1}, s_2, \ldots, s_N\}$. The bit-reversal interleaver may not be included in a transmitting side. The relationship of Equation is illustrated in FIG. 3.

Figure 3:
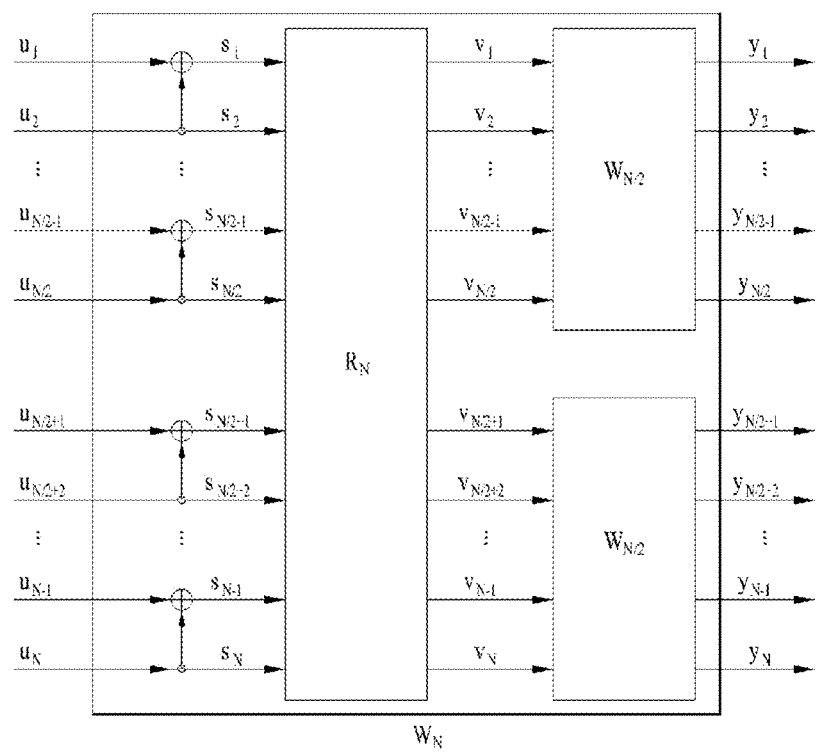
FIG. 3 illustrates the concept of channel combining and channel splitting for channel polarization.

FIG. 3 illustrates N-th level channel combining for a polar code.

A process of defining an equivalent channel for specific input after combining N B-DMCs Ws is called channel splitting. Channel splitting may be represented as a channel transition probability indicated by the following equation.

$$W_N^i(y_1^N, u_1^{i-1}|u_i) = \sum_{u_{i+1}^N} \frac{1}{2^{N-1}} W_N(y_1^N|u_1^N)$$

Equation 7

Channel polarization has the following characteristics:

Conservation: $C(W^-)+C(W^+)=2C(W)$,

Extremization: $C(W^-) \leq C(W) \leq C(W^+)$.

When channel combining and channel splitting are performed, the following theorem may be obtained.

* Theorem: For any B-DMC W, channels $\{W_N^{(i)}\}$ are polarized in the following sense. For any fixed $\delta \in \{0,1\}$, as N goes to infinity through powers of 2, the fraction of indexes $i \in \{1, \ldots, N\}$ for channel capacity $I(W_N^{(i)}) \in (1-\delta, 1]$ goes to $I(W)$ and the faction of i for channel capacity $I(W_N^{(i)}) \in [0,6)$ goes to $1-I(W)$. Hence, if $N \to \infty$, then channels are perfectly noisy or are polarized free of noise. These channels can be accurately recognized by the transmitting side. Therefore, bad channels are fixed and non-fixed bits may be transmitted on good channels.

That is, if the size N of polar codes is infinite, a channel has much noise or is free of noise, with respect to a specific input bit. This has the same meaning that the capacity of an equivalent channel for a specific input bit is divided into 0 or I(W).

Inputs of a polar encoder are divided into bit channels to which information data is mapped and bit channels to which the information data is not mapped. As described earlier, according to the theorem of the polar code, if a codeword of the polar code goes to infinity, the input bit channels may be classified into noiseless channels and noise channels. Therefore, if information is allocated to the noiseless bit channels, channel capacity may be obtained. However, in actuality, a codeword of an infinite length cannot be configured, reliabilities of the input bit channels are calculated and data bits are allocated to the input bit channels in order of reliabilities. In the present disclosure, bit channels to which data bits are allocated are referred to as good bit channels. The good bit channels may be input bit channels to which the data bits are mapped. Bit channels to which data is not mapped are referred to as frozen bit channels. A known value (e.g., 0) is input to the frozen bit channels and then encoding is performed. Any values which are known to the transmitting side and the receiving side may be mapped to the frozen bit channels. When puncturing or repetition is performed, information about the good bit channels may be used. For example, positions of codeword bits (i.e., output bits) corresponding to positions of input bits to which information bits are not allocated may be punctured.

Figure 4:
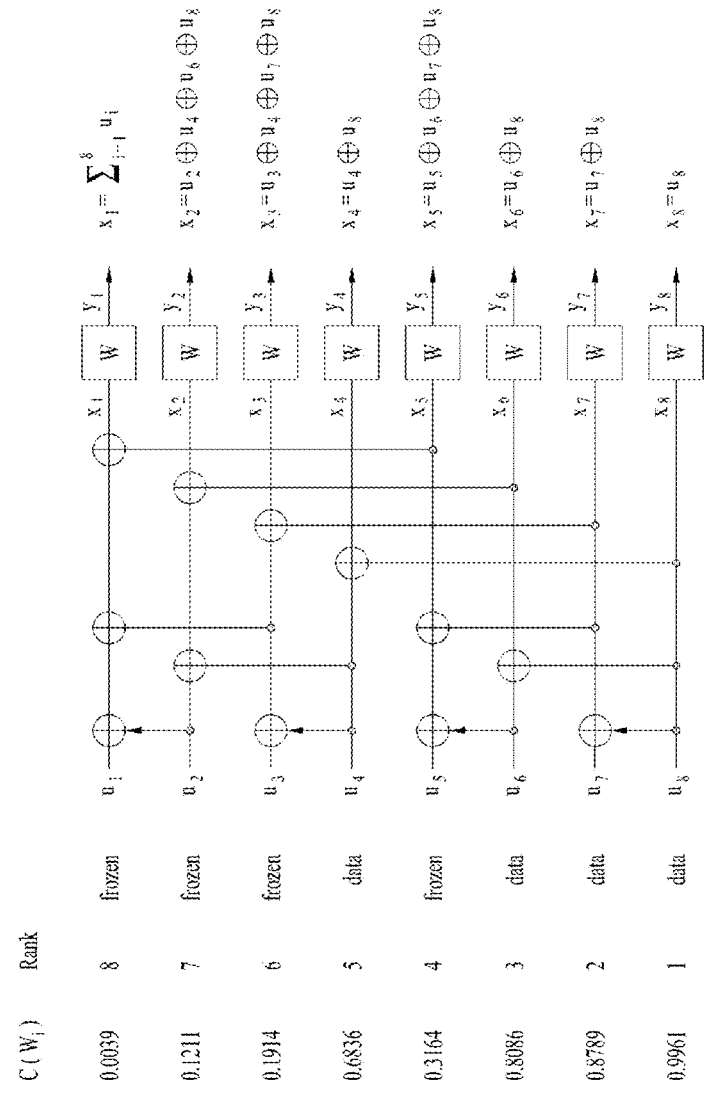
FIG. 4 illustrates N-th level channel combining for a polar code.

FIG. 4 illustrates the concept of selecting position(s) to which information bit(s) are to be allocated in polar codes.

In FIG. 4, it is assumed that the size N of mother codes is 8, i.e., the size N of polar codes is 8, and a code rate is 1/2.

Figure 8:
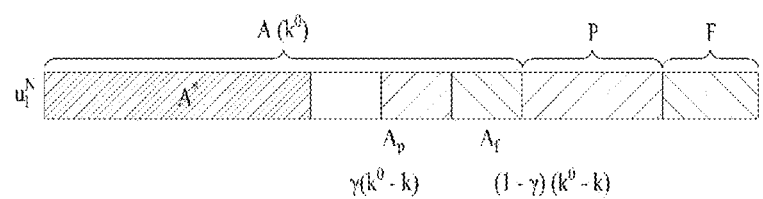

In FIG. 4, $C(W_i)$ denotes the capacity of a channel $W_i$ and corresponds to the reliability of channels that input bits of a polar code experience. When channel capacities corresponding to input bit positions of the polar code are as illustrated in FIG. 8, reliabilities of the input bit positions are ranked as illustrated in FIG. 8. To transmit data at a code rate of 1/2, a transmitting device allocates 4 bits constituting the data to 4 input bit positions having high channel capacities among 8 input bit positions (i.e., input bit positions denoted as $U_4$, $U_6$, $U_7$, and $U_8$ among input bit positions $U_1$ to $U_8$ of FIG. 8) and freezes the other input bit positions. A generator matrix $G_8$ corresponding to the polar code of FIG. 8 is as follows. The generator matrix $G_8$ may be acquired based on Equation 6.

$$G_8 = \begin{bmatrix} 1 & 0 & 0 & 0 & 0 & 0 & 0 & 0 \\ 1 & 1 & 0 & 0 & 0 & 0 & 0 & 0 \\ 1 & 0 & 1 & 0 & 0 & 0 & 0 & 0 \\ 1 & 1 & 1 & 1 & 0 & 0 & 0 & 0 \\ 1 & 0 & 0 & 0 & 1 & 0 & 0 & 0 \\ 1 & 1 & 0 & 0 & 1 & 1 & 0 & 0 \\ 1 & 0 & 1 & 0 & 1 & 0 & 1 & 0 \\ 1 & 1 & 1 & 1 & 1 & 1 & 1 & 1 \end{bmatrix}$$

Equation 8

The input bit positions denoted as $U_1$ to $U_8$ of FIG. 4 correspond one by one to rows from the highest row to the lowest row of $G_8$. Referring to FIG. 8, it may be appreciated that the input bit corresponding to $U_8$ affects all output coded bits. On the other hand, it may be appreciated that the input bit corresponding to $U_1$ affects only $Y_1$ among the output coded bits. Referring to Equation 12, when binary-input source bits $U_1$ to $U_8$ are multiplied by $G_8$, a row in which the input bits appear at all output bits is the lowest row [1, 1, 1, 1, 1, 1, 1, 1] in which all elements are 1, among rows of $G_8$. Meanwhile, a row in which the binary-input source bits appears at only one output bit is a row in which one element is 1 among the rows of $G_8$, i.e., a row [1, 0, 0, 0, 0, 0, 0, 0] in which a row weight is 1. Similarly, it may be appreciated that a row in which a row weight is 2 reflects input bits corresponding to the row in two output bits. Referring to FIG. 8 and Equation 12, $U_1$ to $U_8$ correspond one by one to the rows of $G_8$ and bit indexes for distinguishing between input positions of $U_1$ to $U_8$, i.e., bit indexes for distinguishing between the input positions, may be assigned to the rows of $G_8$.

Hereinafter, for Polar codes, it may be assumed that bit indexes from 0 to N−1 are sequentially allocated to rows of $G_N$ starting from the highest row having the smallest row weight with respect to N input bits. For example, referring to FIG. 8, a bit index 0 is allocated to the input position of $U_1$, i.e., the first row of $G_8$ and a bit index 7 is allocated to the input position of $U_8$, i.e., the last row of $G_8$. However, since the bit indexes are used to indicate input positions of the polar code, a scheme different from the above allocation scheme may be used. For example, bit indexes from 0 to N−1 may be allocated staring from the lowest row having the largest row weight.

In the case of output bit indexes, as illustrated in FIG. 8 and Equation 12, it may be assumed that bit indexes from 0 to N−1 or bit indexes from 1 to N are assigned to columns from the first column having the largest column weight to the last column having the smallest column weight among columns of $G_N$.

In Polar codes, setting of information bits and frozen bits is one of the most important elements in the configuration and performance of the polar code. That is, determination of ranks of input bit positions may be an important element in the performance and configuration of the polar code. For Polar codes, bit indexes may distinguish input or output positions of the polar code. In the present disclosure, a sequence obtained by enumerating reliabilities of bit positions in ascending or descending order are referred to as a bit index sequence. That is, the bit index sequence represents reliabilities of input or output bit positions of the polar code in ascending or descending order. A transmitting device inputs information bits to input bits having high reliabilities based on the input bit index sequence and performs encoding using the polar code. A receiving device may discern input positions to which information bits are allocated or input positions to which frozen bits are allocated, using the same or corresponding input bit index sequence. That is, the receiving device may perform polar decoding using an input bit index sequence which is identical to or corresponds to an input bit index sequence used by the transmitting device and using a corresponding polar code. In the following description, it may be assumed that an input bit index sequence is predetermined so that information bit(s) may be allocated to input bit position(s) having high reliabilities. In the present disclosure, the input bit index sequence is also called a Polar sequence.

In the case of the polar code, decoding may be generally performed in the following order.

1. Bit(s) having low reliabilities are recovered first. Although reliability differs according to the structure of a decoder, since an input index in an encoder (hereinafter, an encoder input bit index or bit index) having a low value usually has a low reliability, decoding is generally performed staring from a low encoder input bit index.

2. When there is a known bit for a recovered bit, the known bit is used together with the recovered bit or the process of 1 is omitted and a known bit for a specific input bit position is immediately used, thereby recovering an information bit, which is an unknown bit. The information bit may be a source information bit (e.g., a bit of a transport block) or a CRC bit.

Embodiment

Figure 6:
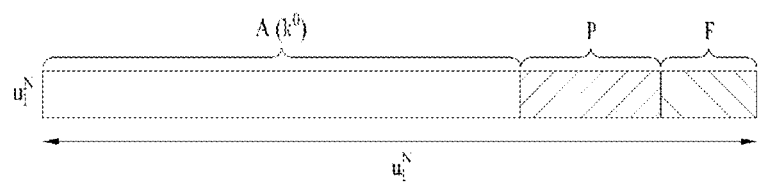
FIGS. 6 to 8 illustrate conversion of pre-code output according to an embodiment of the present disclosure.

FIGS. 5 and 6 illustrate an encoding process based on algebraic concatenated code.

Referring to FIG. 5, a generator matrix $G_{alg}$ of a linear code with a code length of N and a message length of k may be decomposed into a product of a pre-code matrix Z and a polar code $F^{\otimes n}$.

$$G_{alg} = Z \cdot F^{\otimes n} \quad \text{[Equation 9]}$$

The matrix Z may be determined by the following equation.

$$Z = G_{alg} \cdot (F^{\otimes n})^{-1} \quad \text{[Equation 10]}$$

Here, $(F^{\otimes n})^{-1}$ is the same as $F^{\otimes n}$, and thus may be $Z = G_{alg} \cdot F^{\otimes n}$.

Referring to FIG. 6, assuming that a message vector is $m_1^k := [m_1, m_2, \ldots, m_k]$ and an input of the polar code is $u_1^N$, $u_1^M$ may be divided into three sets including an information set $\mathcal{F}$, a frozen set $\mathcal{A}$, and a parity set $\mathcal{P}$. The message $m_1^k$ is input as is at a location corresponding $\mathcal{A}$ to the information set, and a value fixed to 0 is input to the frozen set. The parity set contains a bit generated as the single parity checksum of previous messages. The location of the set $\mathcal{A}, \mathcal{F}, \mathcal{P}$ and a checksum generation rule of $\mathcal{P}$ may be found by analyzing columns of the matrix Z. In detail, in the matrix Z, a vector column of 0 may be classified as a frozen set, a pivoting column with one 1 may be classified as an information set, and the other columns with one or more is may be classified as a dynamic set. In this case, the checksum of $\mathcal{P}$ may be obtained by adding a message at the location of 1 in the corresponding column.

The decoding process of the concatenated code begins with decoding $\hat{u}_1^N$ from a channel output to an input of the polar code. When an LSC decoder is used, $u_1$ to $u_N$ may be sequentially decoded. When $u_i$ belongs to $\mathcal{F}_s$, $u_i$ is decoded as $\hat{u}_i = 0$, and when $u_i$ belongs to $\mathcal{F}_d$, $u_i$ is determined as the sum of previously decoded messages. Finally, after decoding proceeds up to $u_N$, decoding is completed by outputting a candidate with the largest metric in a list.

As described above, when an algebraic code is reinterpreted as a concatenation code with a polar code, it is easy to analyze algebraic characteristics such as a minimum distance $d_{min}$ or a minimum distance code $A_{d_{min}}$, and efficient soft decoding using an the existing LSC decoding algorithm used in the polar code is also possible. However, the LSC decoder may show high performance when the code design results applies the channel characteristics, but the algebra-based code does not apply the channel characteristics, and thus it is not possible to ensure high performance. The present disclosure proposes a method of optimizing a code by applying channel characteristics in a design process of an algebraic code and optimizing the algebraic parameters of the code, $d_{min}$ and $A_{d_{min}}$.

The concatenated code proposed in the present disclosure may be optimized through a process of first designing an algebraic code and converting the bit(s) in the information set into a frozen set or a parity set. For example, the concatenated code proposed in the present disclosure may be optimized through a process of first designing an algebraic code with a code rate $R_0(R_0 > R)$ greater than a target message length R and converting $N(R_0 - R)$ bits in the information set into a frozen set or a parity set. To this end, the existing pre-code matrix Z can be transformed into $\check{Z}$.

Figure 7:
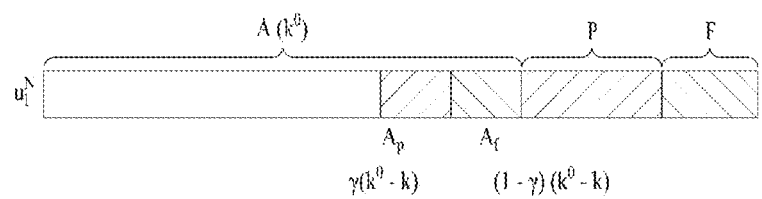

Referring to FIGS. 7 and 8, a detailed process is as follows.

1. For a target code rate R, a code rate $R^{(0)}$ and a minimum distance $d_{min}^{(0)}$ of an algebraic code that is $R^{(0)} > R$ and is closest to R.

2. $\mathcal{A}^{(\ell)}, \mathcal{F}^{(\ell)}, \mathcal{P}^{(\ell)}$ is derived through an algebraic code design with a code rate $R^{(\ell)}$ and a minimum distance $d_{min}^{(\ell)}$ and calculation of $Z = G_{alg} \cdot (F^{\otimes n})^{-1}$. $\ell$ is an integer greater than or equal to 0.

3. $(R^{(\ell)} - R)N$ information set elements are changed to a frozen or parity set until a code rate reaches R (Z is changed).

4. $d_{min}$ that minimize an error rate and design parameters $\mathcal{A}, \mathcal{F}, \mathcal{P}$ and Z are derived by repeatedly performing the processes 2 to 3 at a high code rate $R^{(\ell+1)} > R^{(\ell)}$ ($d_{min}^{(\ell+1)} < d_{min}^{(\ell)}$).

The above process is a process of obtaining a point that minimizes an error rate while changing $d_{min}$ of an algebraic code. In the process 3, $n_p = \gamma(R^{(\ell)} - R)N$ information set bits from among $(R^{(\ell)} - R)N$ information set bits are converted into parity sets/bits ($\mathcal{A}_p$) and $n_f = (1 - \gamma)(R^{(\ell)} - R)N$ information set bits are converted into frozen sets/bits ($\mathcal{A}_f$) by using the parameter $\gamma$. A location converted to the frozen set is determined as $n_f$ bits with the largest SC error in $\mathcal{A}^{(\ell)} \setminus \mathcal{A}^*$ by comparing $\mathcal{A}^{(\ell)}$ with the optimal information set $\mathcal{A}^*$. The optimal information set $\mathcal{A}^*$ may be determined using Arikan rules or communication standards (e.g., 5G NR). For the remaining set, a minimum row weight d* and a minimum row weight index $\mathcal{A}_{LW}$ may be defined as follows.

$$\mathcal{A}_{LW} := \{i | g_i = d^*, i \in \mathcal{A} \setminus \mathcal{A}_f\} \quad \text{[Equation 11]}$$

$$d^* = \min\{g_i | i \in \mathcal{A} \setminus \mathcal{A}_f\}$$

Here, $g_i$ is a i-th row vector of $F^{\otimes n}$. In $\mathcal{A}_{LW}$, $n_p$ indices with high SC errors are determined as parity bits. When additional frozen bits and parity bits are determined, all elements of a column corresponding to the frozen set in the pre-code matrix Z are changed to 0.1 may be added to the column corresponding to the parity bit through algebraic analysis.

FIGS. 9 to 12 illustrate a process of generating Z→Ž. In the drawings, a code (k=16) with a target code rate of 0.5 is assumed to be designed from an eBCH code N=32, $k^0$=21.

Figure 9:
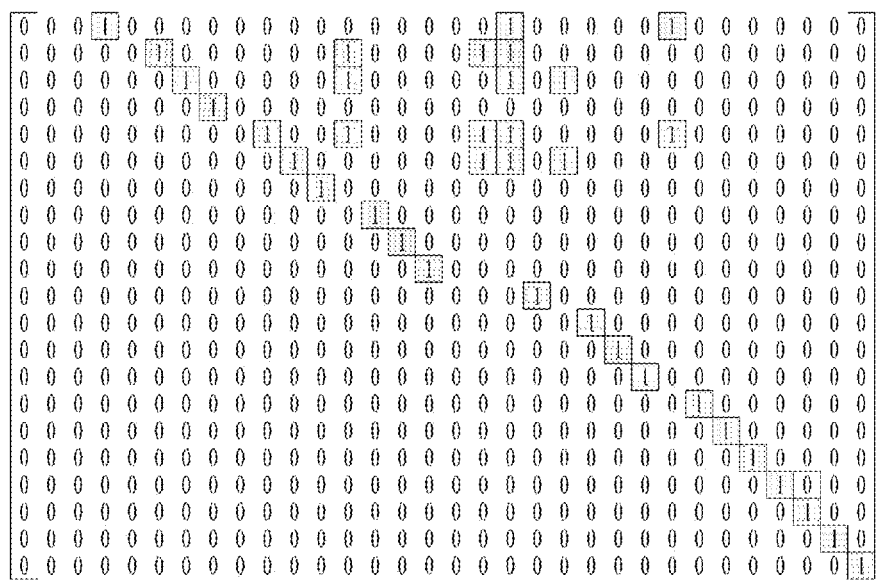
FIGS. 9 to 12 illustrate conversion of a pre-code matrix according to an embodiment of the present disclosure.

FIG. 9 shows a pre-code matrix Z of the eBCH code (32, 21). For visibility, the location in the matrix is shaded. The matrix Z is expressed below in terms of the parameter $\mathcal{A}, \mathcal{F}, \mathcal{P}$ of a polar code.

$$\mathcal{A} = \{4, 6, 7, 8, 10, 11, 12, 14, 15, \quad \text{[Equation 11]}$$
$$16, 20, 22, 23, 24, 26, 27, 28, 29, 30, 31, 32\}$$

$$\mathcal{F} = \{1, 2, 3, 5, 9, 17\}$$

$$\mathcal{P} = \{13, 18, 19, 21, 15\}$$

In this case, achieve the target code rate, 5 of elements of $\mathcal{A}$ needs to be moved/converted to $\mathcal{F}$ or $\mathcal{P}$. 5*γ=2 elements may be moved/converted to $\mathcal{P}$ and 5*(1−γ)=3 elements may be moved/converted to $\mathcal{F}$ by using the parameter γ=0.4.

First, $\mathcal{A}^*$ is calculated to obtain an element to be moved to $\mathcal{F}$. $\mathcal{A}^*$ may refer to communication standards (e.g., 5G NR; 3GPP TS 38.212). For example, in (32, 16), $\mathcal{A}^*$ may be defined as follows.

$$\mathcal{A}^* = \{8, 12, 14, 15, 16, 20, 22, 23, \quad \text{[Equation 12]}$$
$$24, 26, 27, 28, 29, 30, 31, 32\}$$

Figure 10:
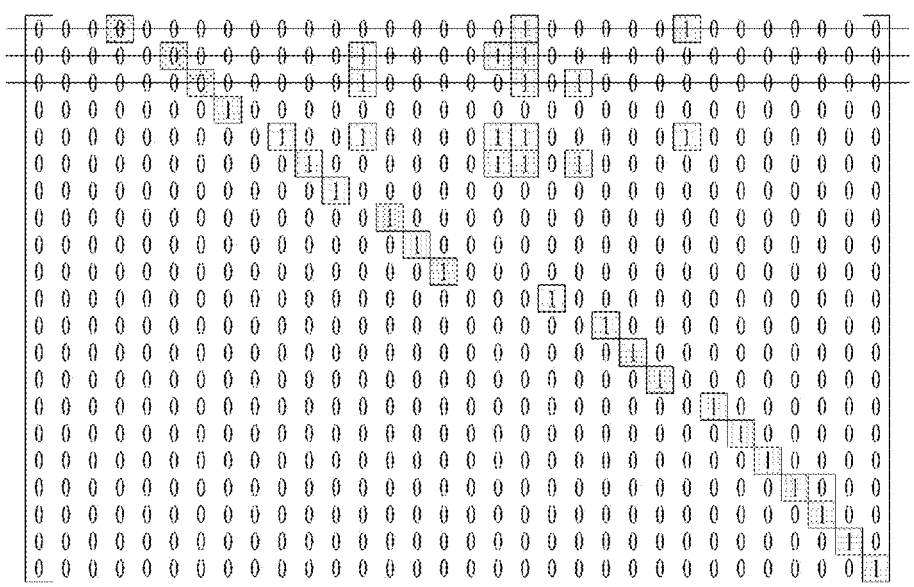

In $\mathcal{A}$, elements not included in $\mathcal{A}^*$, $\mathcal{A} \setminus \mathcal{A}^*$ is {4, 6, 7, 10, 11}. Thereamong, three elements with a high SC error rate may be moved/converted to $\mathcal{F}$. An SC error rate may be calculated through quantization or Gaussian approximation methods. The SC error rate of each element is {0.2762, 0.2282, 0.1873, 0.1677, 0.1299}, and the first three elements with the highest error rate, {4, 6, 7}, may be converted to F. This is equivalent to filling columns 4, 6, and 7 in the matrix with vector 0 and deleting the corresponding pivot row, and the resulting transformed matrix is as shown in FIG. 10. Regarding the transformed parts, the part converted to vector 0 is indicated with shading, and the deleted row is indicated with a solid line.

As a result, after three columns are deleted, the remaining matrix with size 18×32 is Ž. 2 bits need to be additionally changed to $\mathcal{P}$ The remaining elements of $\mathcal{A}$ are as follows.

$$\mathcal{A} \setminus \mathcal{A}_f = \{8, 10, 11, 12, 14, 15, \quad \text{[Equation 13]}$$
$$16, 20, 22, 23, 24, 26, 27, 28, 29, 30, 31, 32\}$$

For $\mathcal{A} \setminus \mathcal{A}_f$, a value obtained by subtracting 1 from each element may be converted to binary. For example, when a value obtained by subtracting 1 from element 8 and converting the result value to binary is (00111), 10 corresponds to (01001), and 11 corresponds to (01010). When converted to binary, the number of 1s is defined as a weight. Weights for all elements of the remaining $\mathcal{A}$ are as follows.

weight of $\mathcal{A} \setminus \mathcal{A}_f = $ [Equation 14]
$$\{3, 2, 2, 3, 3, 3, 4, 3, 3, 3, 4, 3, 3, 4, 3, 4, 4, 5\}$$

Here, columns 10 and 11 with the smallest weight may be moved/converted to $\mathcal{P}$. When the number of elements with a low weight is greater than necessary, elements may be selected based on a high SC error rate. When the number of elements with a lower weight is less than necessary, the required number of elements may be extracted from the next larger weight. This is shown in the form of deleting the pivot row as in $\mathcal{F}$ on the matrix (refer to FIG. 11).

Figure 11:
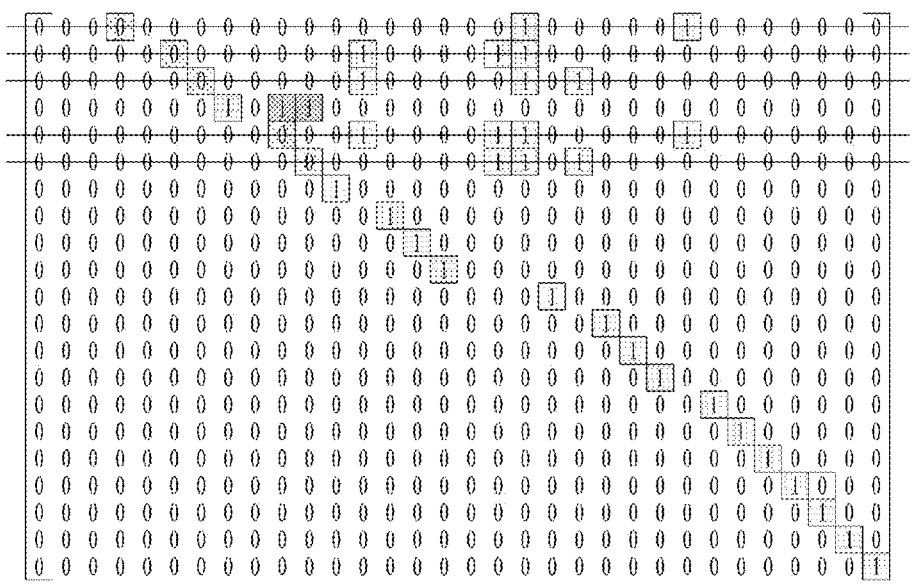

However, unlike $\mathcal{F}$, $\mathcal{P}$ may generate a parity-check by randomly adding 0 and 1 to the upper part of the deleted row (shaded in red). In the example of FIG. 11, a parity-check is generated by adding 1 to all corresponding regions.

Figure 12:
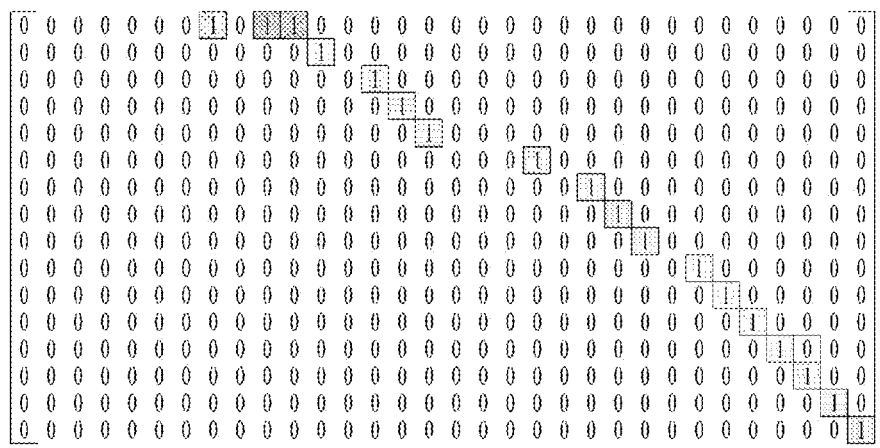

The resulting matrix Ž is shown in FIG. 12.

Figure 13:
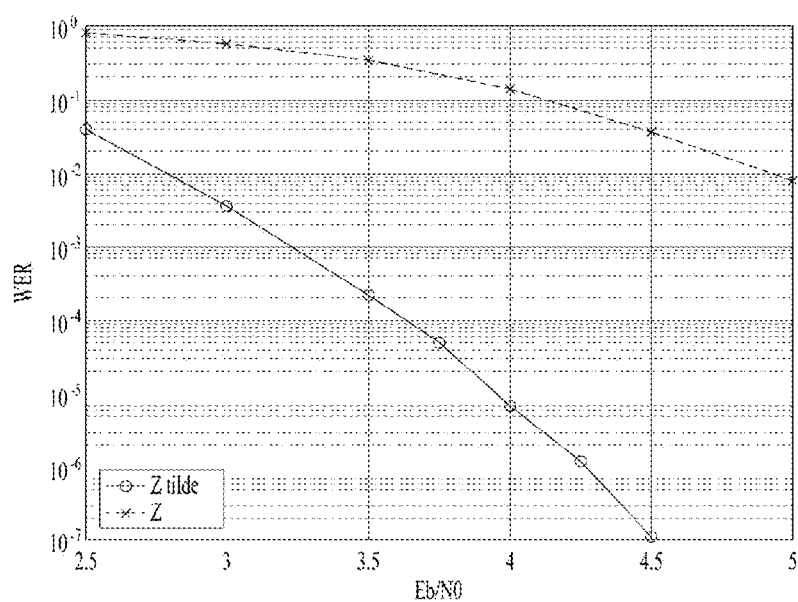
FIGS. 13 to 14 illustrate a simulation result for a code according to the present disclosure.

FIG. 13 shows comparison in LSC decoding performance of polar codes generated using Z and Ž in an $d_{min}$>11 environment with a code length N=256 and a message length k=180. It may be seen that the LSC decoding performance of the polar code generated using Ž is high.

Figure 14:
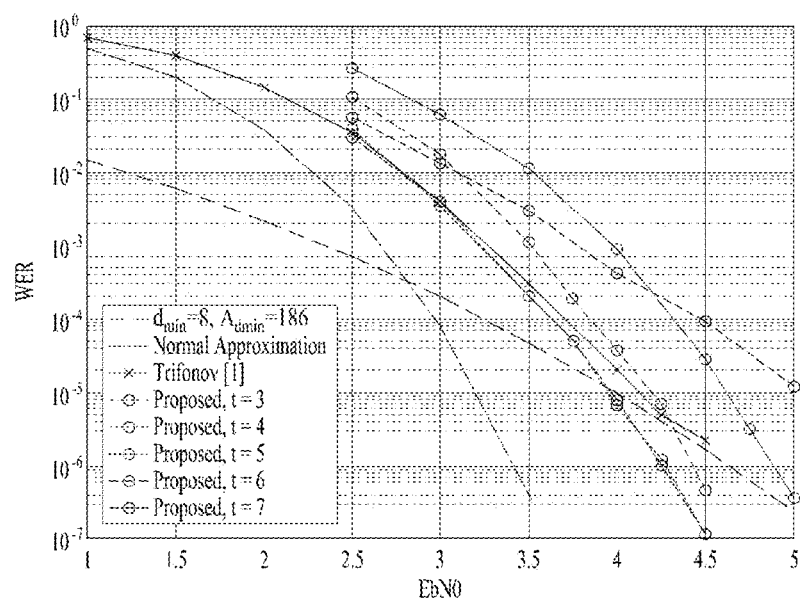

FIG. 14 shows word error rate performance while changing $d_{min}$=2t+1 from a code length of 256, a message length of 180, and γ of 0.4. The Trifonov method, a similar existing method, and the normal approximation bound, which is a limit of theoretical performance, are also shown. When t=4 or 5, the Trifonov method has overall high performance. When t=6, high performance is obtained for the Trifonov method in a situation in which EbN0 is greater than 4.

For example, an information set $\mathcal{A}$ a frozen set $\mathcal{F}$, and a parity set $\mathcal{P}$ and a parity-check expression that are codes designed with a code length N=256, a message length k=180, and a minimum length $d_{min}$=11 are listed as follows.

$\mathcal{A} = \{$16 24 28 30 31 32 40 44 46 47 48 52 54 55 56 57 58 59

60 61 62 63 64 72 76 78 79 80 84 85 86 87 88 89 90

91 92 93 94 95 96 98 99 100 101 102 103 104 105 106

107 108 109 110 111 112 113 114 115 116 117 118 119

120 121 122 123 124 125 126 127 128 136 139 140 141

142 143 144 146 147 148 149 150 151 152 153 154 155

156 157 158 159 160 162 163 164 165 166 167 168 170

171 172 173 174 175 176 178 179 180 181 182 183 184

185 186 187 188 189 190 191 192 196 198 199 200 202

203 204 205 206 207 208 210 211 212 213 214 215 216

217 218 219 220 221 222 223 224 226 227 228 229 230

-continued 231 232 233 234 235 236 237 238 239 240 241 242 243

244 245 246 247 248 249 250 251 252 253 254 255 256}

$\mathcal{F}$ = {1 2 3 4 5 6 7 8 9 10 11 12 13 14 15 17 18 19 20 21

22 23 25 26 27 29 33 34 35 36 37 38 39 41 42 43 49 65 66

67 68 69 70 73 81 97 129 130 131 133 137 145 161 193}

$\mathcal{P}$ = {45 50 51 53 71 74 75 77 82 83

132 134 135 138 169 177 194 195 197 201 209 225}

The parity-check expression is as follows. The values within [ ] indicate indices of messages added to generate parity bits.

example)[16 28 31 44 45]→$u_{16}+u_{28}+u_{31}+u_{44}=u_{45}$

[16 28 31 44 45]
[24 30 31 32 40 48 50]
[28 31 32 40 46 47 48 51]
[16 24 28 30 32 46 47 53]
[24 28 30 40 44 47 55 57 59 60 61 63 64 71]
[16 32 40 44 46 48 52 55 56 60 61 72 74]
[30 31 40 44 52 55 56 57 58 62 64 75]
[16 30 31 40 44 46 48 55 57 60 62 64 76 77]
[16 24 30 32 44 46 47 54 55 56 57 64 72 82]
[24 28 32 40 44 46 47 52 56 57 60 64 76 78 79 83]
[16 30 40 54 57 58 59 60 61 62 63 76 80 85 86 88 89 90 92 94 95 98 99 102 105 107 112 113 114 117 118 119 120 122 124 125 126 127 132]
[24 30 40 46 52 58 60 64 72 76 78 79 84 85 86 88 89 90 94 95 100 104 107 110 111 112 113 118 120 122 123 124 126 134]
[16 28 30 32 40 52 54 57 58 62 63 64 72 76 79 86 87 89 91 94 98 100 101 102 103 105 106 108 110 111 113 114 116 117 119 121 122 123 126 135]
[24 28 32 44 47 48 56 58 59 62 76 85 87 88 90 94 104 105 106 110 113 115 116 120 121 122 123 124 125 136 138]
[24 28 32 48 54 55 60 64 79 80 84 86 88 89 90 91 92 98 101 103 108 110 113 115 120 123 124 126 127 136 141 146 149 169]
[16 28 30 31 32 44 46 47 48 52 54 56 57 58 62 63 76 78 84 85 87 88 90 91 95 98 102 103 104 105 106 107 108 112 113 114 116 117 118 119 120 121 124 147 162 163 177]
[28 46 52 56 57 58 61 72 78 79 80 84 92 99 100 102 104 110 111 114 117 119 123 125 127 139 149 162 194]
[3140 52 54 58 59 60 64 76 78 80 84 86 87 91 92 94 99 101 103 104 106 108 113 116 121 122 125 126 127 146 147 153 163 165 195]
[24 30 31 46 47 52 55 58 59 61 62 64 72 76 78 80 87 88 90 91 92 95 99 100 103 105 106 107 108 110 111 112 113 116 118 120 121 123 124 125 127 146 153 162 163 197]
[16 24 31 32 48 56 57 59 61 63 64 72 78 79 80 86 88 89 90 92 94 95 98 102 107 112 113 114 117 118 119 120 122 124 125 126 127 149 153 162 163 165 201]
[28 30 32 48 56 60 62 72 76 79 86 88 90 91 98 100 102 103 104 108 111 113 114 115 117 119 120 124 125 126 136 139 141 153 162 165 209]
[24 28 52 54 58 59 62 63 64 76 79 80 85 89 91 92 94 95 98 99 100 103 104 105 107 108 111 112 113 115 118 122 127 136 139 149 163 165 225]

Figure 15:
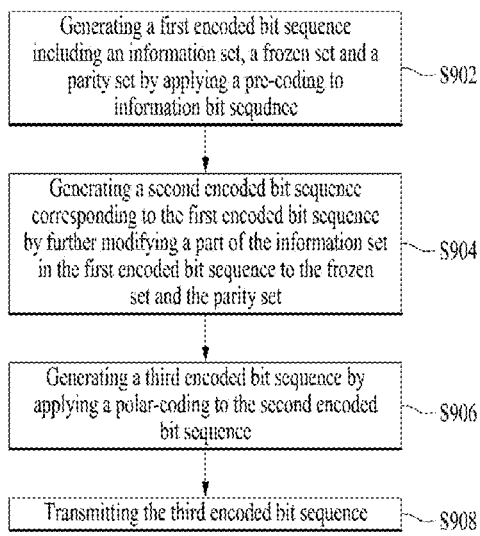
FIG. 15 illustrates a transmission process according to an embodiment of the present disclosure.

FIG. 15 illustrates a signal transmission method according to an embodiment the present disclosure. Referring to FIG. 15, a transmitting device may apply a pre-code to an information bit sequence to generate a first encoded bit sequence including an information set, a frozen set, and a parity set (S902). Then, a transmitter may further change a portion of the information set of the first encoded bit sequence to the frozen set and the parity set to generate a second encoded bit sequence corresponding to the first encoded bit sequence (S904). The transmitter may generate a third encoded bit sequence by applying a polar code to the second encoded bit sequence (S906). Then, the transmitter may transmit the third encoded bit sequence (S908).

Here, the pre-code and the polar code may be a portion of a concatenated code. The concatenated code may have a first code rate, and the first code rate may be greater than a target code rate for the information bit sequence.

The sizes of the frozen set and the parity set may satisfy the following:

Frozen set: $n_f = r1*(R^{(t)}-R)*N$

Parity set: $n_p = r2*(R^{(t)}-R)*N$

Here, r1 and r2 are values between 0 and 1, r1+r2 is 1, $R^{(t)}$ is the first code rate, R is the second code rate, and N is a code length of the polar code.

The second encoded bit sequence may include the following.

TABLE 1

| | Bit location |
|---|---|
| Information set | 16, 24, 28, 30, 31, 32, 40, 44, 46, 47, 48, 52, 54, 55, 56, 57, 58, 59, 60, 61, 62, 63, 64, 72, 76, 78, 79, 80, 84, 85, 86, 87, 88, 89, 90, 91, 92, 93, 94, 95, 96, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 136, 139, 140, 141, 142, 143, 144, 146, 147, 148, 149, 150, 151, 152, 153, 154, 155, 156, 157, 158, 159, 160, 162, 163, 164, 165, 166, 167, 168, 170, 171, 172, 173, 174, 175, 176, 178, 179, 180, 181, 182, 183, 184, 185, 186, 187, 188, 189, 190, 191, 192, 196, 198, 199, 200, 202, 203, 204, 205, 206, 207, 208, 210, 211, 212, 213, 214, 215, 216, 217, 218, 219, 220, 221, 222, 223, 224, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256 |
| Frozen set | 1, 2, 3, 4, 5, 6, 7, 8, 9, 10, 11, 12, 13, 14, 15, 17, 18, 19, 20, 21, 22, 23, 25, 26, 27, 29, 33, 34, 35, 36, 37, 38, 39, 41, 42, 43, 49, 65, 66, 67, 68, 69, 70, 73, 81, 97, 129, 130, 131, 133, 137, 145, 161, 193 |
| Parity set | 45, 50, 51, 53, 71, 74, 75, 77, 82, 83, 132, 134, 135, 138, 169, 177, 194, 195, 197, 201, 209, 225 |

The polar code decoding method according to the present disclosure may be used in various communication environments. For example, the polar code decoding method according to the present disclosure may be applied to wireless communication (e.g., 5G, 6G communication) to reduce reception complexity. Hereinafter, a system to which the present disclosure is to be applied will be exemplified.

Figure 16:
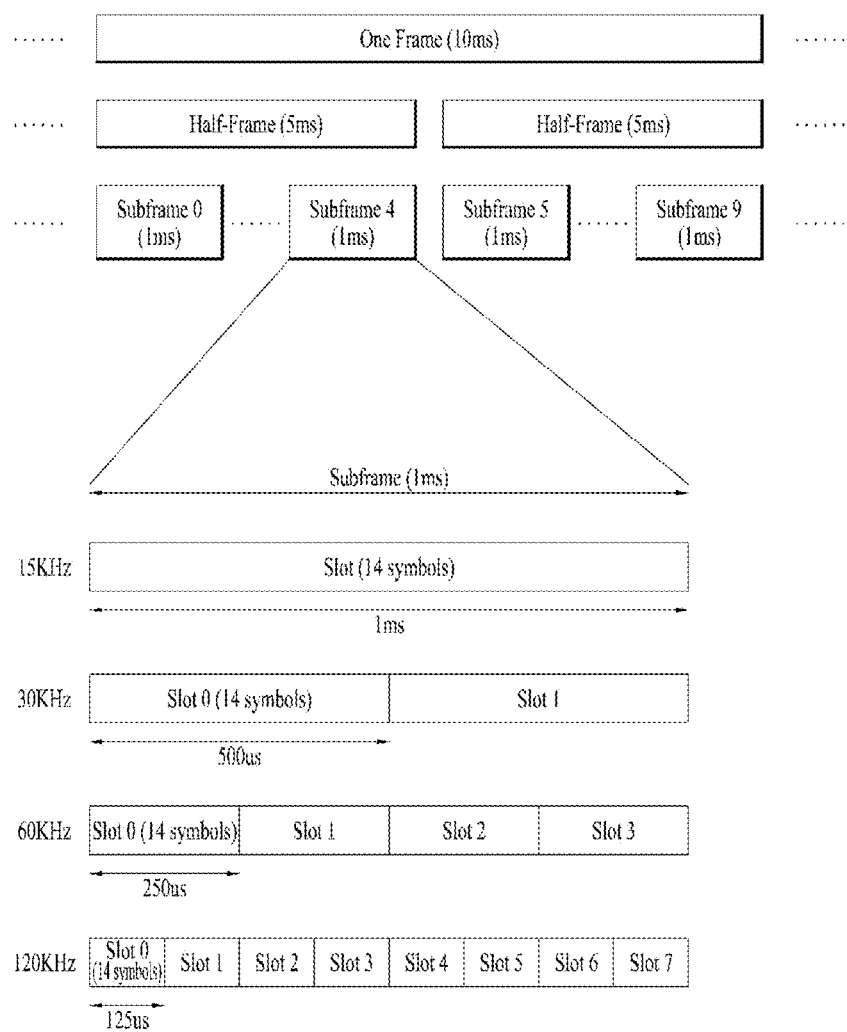
FIG. 16 illustrates a frame structure.

FIG. 16 illustrates a frame structure. The frame structure illustrated in FIG. 16 is purely exemplary and the number of subframes, the number of slots, and/or the number of symbols in a frame may be variously changed. In the NR system, an OFDM numerology (e.g., subcarrier spacing (SCS)) may be differently configured between a plurality of cells aggregated for one UE. Therefore, an (absolute time) duration of a time resource (e.g. a subframe, a slot, or a transmission time interval (TTI)) including the same number of symbols may be differently configured between the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 16, in the NR system, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The following table shows the number of OFDM symbols per slot, the number of slots per frame, and the number of slots per for the normal CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2^u*15$ kHz.

TABLE 3

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols e.g., 14 or 12 symbols) in the time domain. For each numerology (e.g. subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks, (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. PRBs are defined within a bandwidth part (BWP). and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs in a frequency domain. A carrier may include a maximum of N (e.g., 5) BWPs.

For data of a broadcast channel (BCH) transmitted/received through a physical broadcast channel (PBCH), downlink control information transmitted/received through a physical downlink control channel (PDCCH), and uplink control information (UCI) transmitted/received through a physical uplink control channel (PUCCH) or a physical uplink shared channel (PUSCH), a Polar code is used for channel coding in the NR system.

Figure 17:
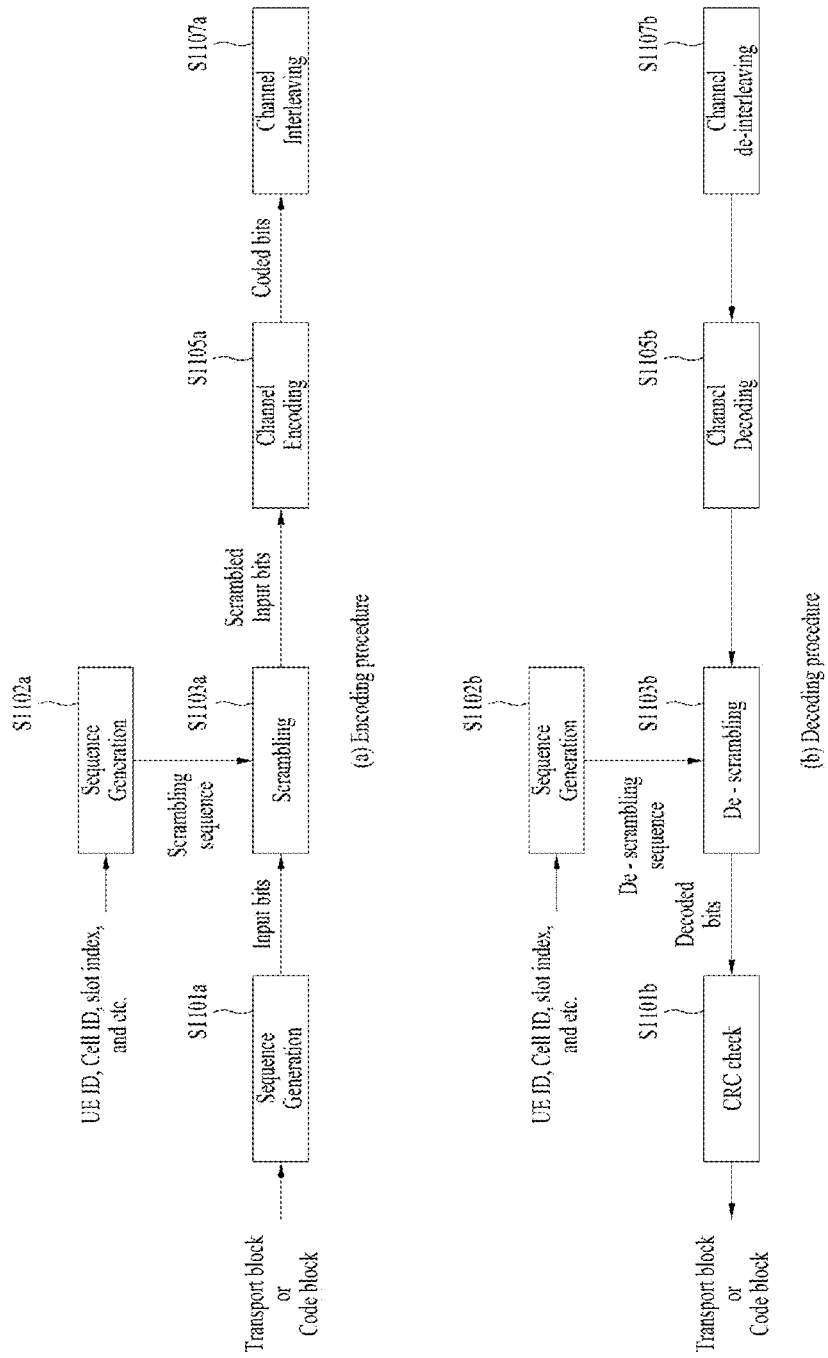
FIG. 17 illustrates an encoding procedure and a decoding procedure in a legacy LTE system.

FIG. 17 illustrates an encoding procedure and a decoding procedure in a legacy LTE system. Particularly, FIG. 17(a) illustrates an encoding procedure including a scrambling process and FIG. 17(b) illustrates a decoding procedure including a descrambling process.

Referring to FIG. 17(a), a transmitting device inserts a CRC code into a transport block or a code block (S1101a) and scrambles obtained input bits using a scrambling sequence (S1103a). The transmitting device channel-encodes the scrambled input bits (S1105a) to generate coded bits and channel-interleaves the coded bits (S1107a). Referring to FIG. 17(b), a receiving device obtains coded bits from received bits based on a channel interleaving pattern applied in the encoding procedure or a channel interleaving pattern corresponding thereto (S1107b) and channel-decodes the coded bits (S1105b) to obtain scrambled bits. The receiving device descrambles the scrambled bits using a scrambling sequence (S1103b) to obtain a sequence of decoded bits (hereinafter, a decoded bit sequence). The receiving device checks whether errors occur in the decoded bit sequence using CRC bits in the decoded bit sequence (S1101b). If CRC for the decoded bit sequence fails, the receiving device determines that decoding of a received signal has failed. If CRC for the decoded bit sequence is successful, the receiving device determines that the decoding procedure has succeeded and may obtain the transport block or the code block by eliminating the CRC bits from the decoded bit sequence.

In FIG. 17(a), CRC generation (S1101a), sequence generation (S1102a), scrambling (S1103a), channel encoding (S1105a), and channel interleaving (S1107a) may be performed by a CRC code generator, a sequence generator, a scrambler, a channel encoder, and a channel interleaver, respectively. The CRC code generator, the sequence generator, the scrambler, the channel encoder, and the channel interleaver may constitute a part of a processor of the transmitting device and may be configured to be operated under control of the processor of the transmitting device. In FIG. 17(b), CRC check (S1101b), sequence generation (S1102b), descrambling (S1103b), channel decoding (S1105b), and channel interleaving (S1107b) may be performed by a CRC checker, a sequence generator, a descrambler, a channel decoder, and a channel interleaver, respectively. The CRC checker, the sequence generator, the descrambler, the channel decoder, and the channel interleaver may constitute a part of a processor of the receiving device and may be configured to be operated under control the processor of the receiving device. In the legacy LTE system, the scrambler generates an m-sequence using a UE ID, a cell ID, and/or a slot index and then scrambles input bits consisting of information bits and CRC bits, which are input to the scrambler, using the m-sequence. The descrambler generates an m-sequence using a UE ID, a cell ID, and/or a slot index and then descrambles input bits consisting of information bits and CRC bits, which are input to the descrambler, using the m-sequence.

For more details of the encoding procedure and decoding procedure of the legacy LTE system, reference may be made to 3GPP TS 36.211, 3GPP TS 36.212, 3GPP 36.331, and/or 3GPP TS 36.331. For more details of the encoding procedure and decoding procedure of the NR system, reference may be made to 3GPP TS 38.211, 3GPP TS 38.212, 3GPP TS 38.213, 3GPP TS 38.214, and/or 3GPP TS 38.331.

The various descriptions, functions, procedures, proposals, methods, and/or operational flowcharts proposals of the present disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable storage medium may store at least one instruction or program, and the at least one instruction or program may cause, when executed by at least one processor, the at least one processor to perform operations according to some embodiments or implementations of the present disclosure.

In the present disclosure, a computer program may be recorded in at least one computer-readable (non-volatile) storage medium, and may include a program code that causes (at least one processor) to perform an operation when being executed according to some embodiments or implements of the present disclosure. The computer program may be provided in the form of a computer program product. The computer program product may include at least one computer readable (non-volatile) storage medium, and the computer readable storage medium may include a program code that causes (at least one processor) to perform an operation when being executed according to some embodiments or implements of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

A communication device of the present disclosure includes at least one processor; and at least one computer memory operably connected to the at least one processor and configured to store instructions for causing, when executed, the at least one processor to perform operations according to example(s) of the present disclosure described later.

Figure 18:
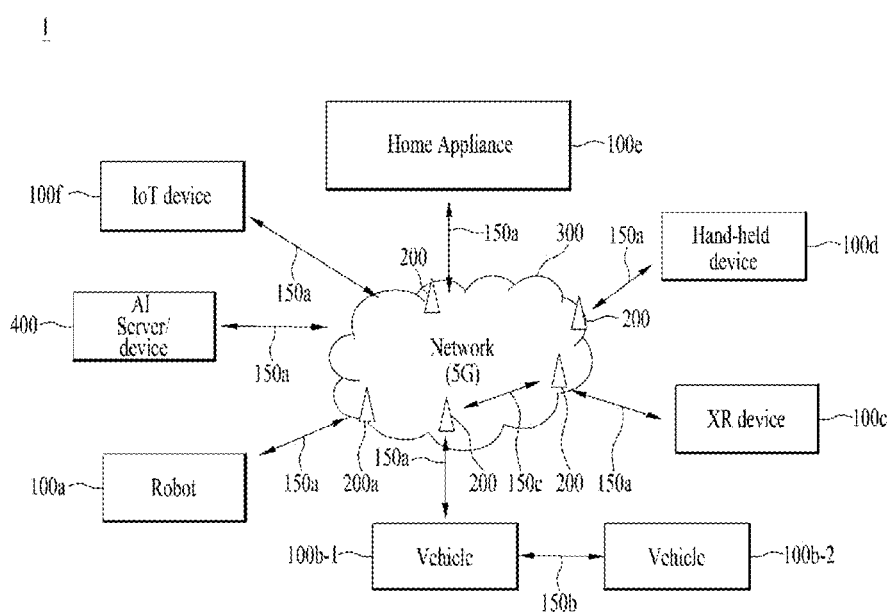
FIGS. 18 to 21 illustrate a communication system and a wireless device that are applied to the present disclosure.

FIG. 18 illustrates a communication system 1 applied to the present disclosure.

Referring to FIG. 18, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
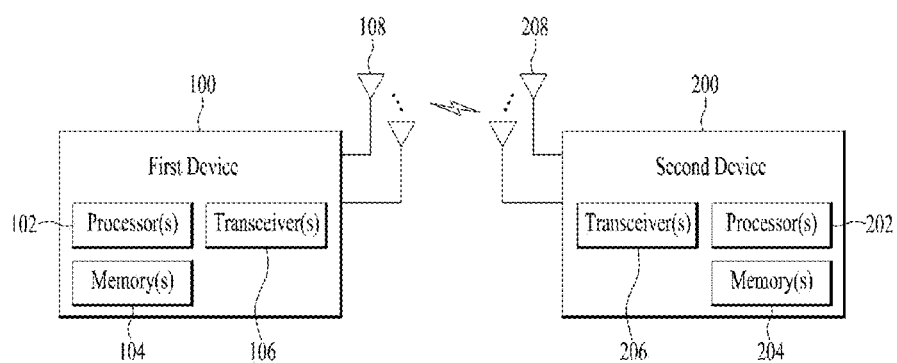

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
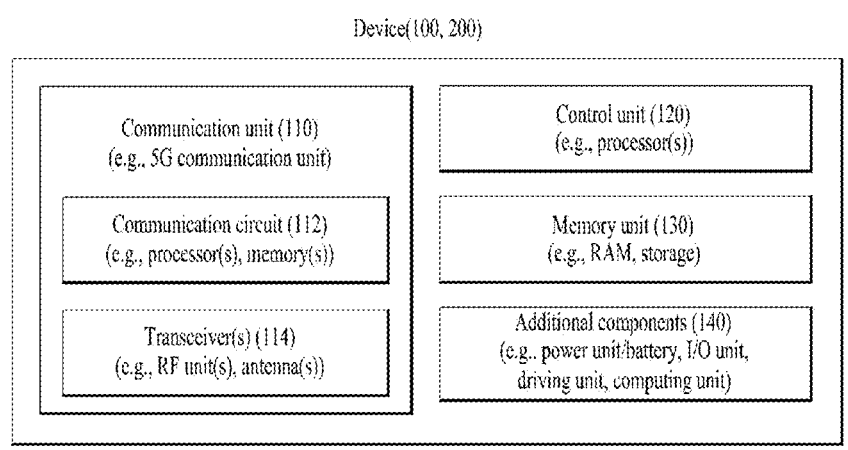

FIG. 20 illustrates another example of a wireless device applied to the present disclosure. The wireless device may be implemented in various forms according to a use-case/service (refer to FIG. 18).

Referring to FIG. 20, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 21:
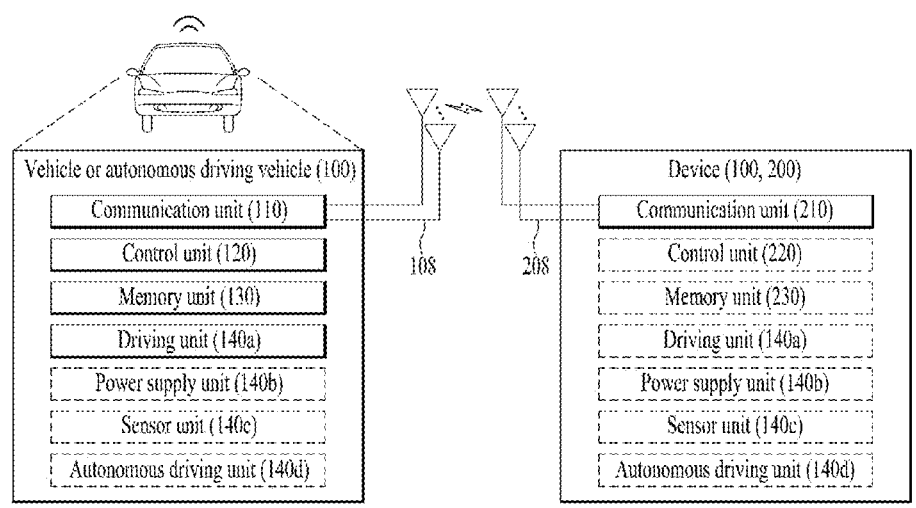

FIG. 21 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, base stations or other apparatuses of a wireless mobile communication system.

What is claimed is:

1. A method of transmitting a signal by a transmission device in a communication system, the method comprising:
generating a first encoded bit sequence including an information set, a frozen set, and a parity set by applying a pre-code to an information bit sequence;
generating a second encoded bit sequence corresponding to the first encoded bit sequence by further changing a portion of the information set of the first encoded bit sequence to the frozen set and the parity set;
generating a third encoded bit sequence by applying a polar code to the second encoded bit sequence; and
transmitting the third encoded bit sequence.

2. The method of claim 1, wherein the pre-code and the polar code are each a portion of a concatenated code.

3. The method of claim 2, wherein the concatenated code has a first code rate, and
the first code rate is greater than a target code rate for the information bit sequence.

4. The method of claim 2, wherein sizes of the frozen set and the parity set satisfy following:

Frozen set: $n_f = r1 * (R^{(t)} - R) * N$

Parity set: $n_p = r2 * (R^{(t)} - R) * N$, and r1 and r2 are values between 0 and 1, r1+r2 is 1, $R^{(t)}$ is the first code rate, R is the second code rate, and N is a code length of the polar code.

5. The method of claim 1, wherein, based on the code length of the polar code being 256, the second encoded bit sequence includes

| | Bit location |
|---|---|
| Information set | 16, 24, 28, 30, 31, 32, 40, 44, 46, 47, 48, 52, 54, 55, 56, 57, 58, 59, 60, 61, 62, 63, 64, 72, 76, 78, 79, 80, 84, 85, 86, 87, 88, 89, 90, 91, 92, 93, 94, 95, 96, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 136, 139, 140, 141, 142, 143, 144, 146, 147, 148, 149, 150, 151, 152, 153, 154, 155, 156, 157, 158, 159, 160, 162, 163, 164, 165, 166, 167, 168, 170, 171, 172, 173, 174, 175, 176, 178, 179, 180, 181, 182, 183, 184, 185, 186, 187, 188, 189, 190, 191, 192, 196, 198, 199, 200, 202, 203, 204, 205, 206, 207, 208, 210, 211, 212, 213, 214, 215, 216, 217, 218, 219, 220, 221, 222, 223, 224, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256 |
| Frozen set | 1, 2, 3, 4, 5, 6, 7, 8, 9, 10, 11, 12, 13, 14, 15, 17, 18, 19, 20, 21, 22, 23, 25, 26, 27, 29, 33, 34, 35, 36, 37, 38, 39, |

| | Bit location |
|---|---|
| | 41, 42, 43, 49, 65, 66, 67, 68, 69, 70, 73, 81, 97, 129, 130, 131, 133, 137, 145, 161, 193 |
| Parity set | 45, 50, 51, 53, 71, 74, 75, 77, 82, 83, 132, 134, 135, 138, 169, 177, 194, 195, 197, 201, 209, 225. |

6. A transmission device in a communication system, the transmission device comprising:
at least one radio frequency unit;
at least one processor; and
at least one computer memory operatively connected to the at least one processor and configured to when executed cause the at least one processor to perform an operation,
wherein the operation includes:
generating a first encoded bit sequence including an information set, a frozen set, and a parity set by applying a pre-code to an information bit sequence;
generating a second encoded bit sequence corresponding to the first encoded bit sequence by further changing a portion of the information set of the first encoded bit sequence to the frozen set and the parity set;
generating a third encoded bit sequence by applying a polar code to the second encoded bit sequence; and
transmitting the third encoded bit sequence.

7. The transmission device of claim 6, wherein the pre-code and the polar code are each a portion of a concatenated code.

8. The transmission device of claim 7, wherein the concatenated code has a first code rate, and
the first code rate is greater than a target code rate for the information bit sequence.

9. The transmission device of claim 7, wherein sizes of the frozen set and the parity set satisfy following:

Frozen set: $n_f = r1*(R^{(t)}-R)*N$

Parity set: $n_p = r2*(R^{(t)}-R)*N$, and r1 and r2 are values between 0 and 1, r1+r2 is 1, $R^{(t)}$ is the first code rate, R is the second code rate, and N is a code length of the polar code.

10. The transmission device of claim 6, wherein, based on the code length of the polar code being 256, the second encoded bit sequence includes

| | Bit location |
|---|---|
| Information set | 16, 24, 28, 30, 31, 32, 40, 44, 46, 47, 48, 52, 54, 55, 56, 57, 58, 59, 60, 61, 62, 63, 64, 72, 76, 78, 79, 80, 84, 85, 86, 87, 88, 89, 90, 91, 92, 93, 94, 95, 96, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 136, 139, 140, 141, 142, 143, 144, 146, 147, 148, 149, 150, 151, 152, 153, 154, 155, 156, 157, 158, 159, 160, 162, 163, 164, 165, 166, 167, 168, 170, 171, 172, 173, 174, 175, 176, 178, 179, 180, 181, 182, 183, 184, 185, 186, 187, 188, 189, 190, 191, 192, 196, 198, 199, 200, 202, 203, 204, 205, 206, 207, 208, 210, 211, 212, 213, 214, 215, 216, 217, 218, 219, 220, 221, 222, 223, 224, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256 |
| Frozen set | 1, 2, 3, 4, 5, 6, 7, 8, 9, 10, 11, 12, 13, 14, 15, 17, 18, 19, 20, 21, 22, 23, 25, 26, 27, 29, 33, 34, 35, 36, 37, 38, 39, 41, 42, 43, 49, 65, 66, 67, 68, 69, 70, 73, 81, 97, 129, 130, 131, 133, 137, 145, 161, 193 |
| Parity set | 45, 50, 51, 53, 71, 74, 75, 77, 82, 83, 132, 134, 135, 138, 169, 177, 194, 195, 197, 201, 209, 225. |

11. An apparatus used in a transmission device, the apparatus comprising:
at least one processor; and
at least one computer memory operatively connected to the at least one processor and configured to when executed cause the at least one processor to perform an operation, wherein the operation includes:
generating a first encoded bit sequence including an information set, a frozen set, and a parity set by applying a pre-code to an information bit sequence;
generating a second encoded bit sequence corresponding to the first encoded bit sequence by further changing a portion of the information set of the first encoded bit sequence to the frozen set and the parity set;
generating a third encoded bit sequence by applying a polar code to the second encoded bit sequence; and
transmitting the third encoded bit sequence.

12. The apparatus of claim 11, wherein the pre-code and the polar code are each a portion of a concatenated code.

13. The apparatus of claim 12, wherein the concatenated code has a first code rate, and
the first code rate is greater than a target code rate for the information bit sequence.

14. The apparatus of claim 12, wherein sizes of the frozen set and the parity set satisfy following:

Frozen set: $n_f = r1*(R^{(t)}-R)*N$

Parity set: $n_p = r2*(R^{(t)}-R)*N$, and r1 and r2 are values between 0 and 1, r1+r2 is 1, $R^{(t)}$ is the first code rate, R is the second code rate, and N is a code length of the polar code.

15. The apparatus of claim 11, wherein, based on the code length of the polar code being 256, the second encoded bit sequence includes

| | Bit location |
|---|---|
| Information set | 16, 24, 28, 30, 31, 32, 40, 44, 46, 47, 48, 52, 54, 55, 56, 57, 58, 59, 60, 61, 62, 63, 64, 72, 76, 78, 79, 80, 84, 85, 86, 87, 88, 89, 90, 91, 92, 93, 94, 95, 96, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 136, 139, 140, 141, 142, 143, 144, 146, 147, 148, 149, 150, 151, 152, 153, 154, 155, 156, 157, 158, 159, 160, 162, 163, 164, 165, 166, 167, 168, 170, 171, 172, 173, 174, 175, 176, 178, 179, 180, 181, 182, 183, 184, 185, 186, 187, 188, 189, 190, 191, 192, 196, 198, 199, 200, 202, 203, 204, 205, 206, 207, 208, 210, 211, 212, 213, 214, 215, 216, 217, 218, 219, 220, 221, 222, 223, 224, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256 |
| Frozen set | 1, 2, 3, 4, 5, 6, 7, 8, 9, 10, 11, 12, 13, 14, 15, 17, 18, 19, 20, 21, 22, 23, 25, 26, 27, 29, 33, 34, 35, 36, 37, 38, 39, 41, 42, 43, 49, 65, 66, 67, 68, 69, 70, 73, 81, 97, 129, 130, 131, 133, 137, 145, 161, 193 |
| Parity set | 45, 50, 51, 53, 71, 74, 75, 77, 82, 83, 132, 134, 135, 138, 169, 177, 194, 195, 197, 201, 209, 225. |

16. A non-transitory computer-readable storage medium including at least one computer program that when executed causes at least one processor to perform an operation, the operation comprising:

generating a first encoded bit sequence including an information set, a frozen set, and a parity set by applying a pre-code to an information bit sequence;

generating a second encoded bit sequence corresponding to the first encoded bit sequence by further changing a portion of the information set of the first encoded bit sequence to the frozen set and the parity set;

generating a third encoded bit sequence by applying a polar code to the second encoded bit sequence; and transmitting the third encoded bit sequence.

17. The non-transitory computer-readable storage medium of claim 16, wherein the pre-code and the polar code are each a portion of a concatenated code.

18. The non-transitory computer-readable storage medium of claim 17, wherein the concatenated code has a first code rate, and the first code rate is greater than a target code rate for the information bit sequence.

19. The non-transitory computer-readable storage medium of claim 17, wherein sizes of the frozen set and the parity set satisfy following:

Frozen set: $n_f = r1*(R^{(t)}-R)*N$

Parity set: $n_p = r2*(R^{(t)}-R)*N$, and r1 and r2 are values between 0 and 1, r1+r2 is 1, R(t) is the first code rate, R is the second code rate, and N is a code length of the polar code.

20. The non-transitory computer-readable storage medium of claim 16, wherein, based on the code length of the polar code being 256, the second encoded bit sequence includes

| | Bit location |
|---|---|
| Information set | 16, 24, 28, 30, 31, 32, 40, 44, 46, 47, 48, 52, 54, 55, 56, 57, 58, 59, 60, 61, 62, 63, 64, 72, 76, 78, 79, 80, 84, 85, 86, 87, 88, 89, 90, 91, 92, 93, 94, 95, 96, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 136, 139, 140, 141, 142, 143, 144, 146, 147, 148, 149, 150, 151, 152, 153, 154, 155, 156, 157, 158, 159, 160, 162, 163, 164, 165, 166, 167, 168, 170, 171, 172, 173, 174, 175, 176, 178, 179, 180, 181, 182, 183, 184, 185, 186, 187, 188, 189, 190, 191, 192, 196, 198, 199, 200, 202, 203, 204, 205, 206, 207, 208, 210, 211, 212, 213, 214, 215, 216, 217, 218, 219, 220, 221, 222, 223, 224, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256 |
| Frozen set | 1, 2, 3, 4, 5, 6, 7, 8, 9, 10, 11, 12, 13, 14, 15, 17, 18, 19, 20, 21, 22, 23, 25, 26, 27, 29, 33, 34, 35, 36, 37, 38, 39, 41, 42, 43, 49, 65, 66, 67, 68, 69, 70, 73, 81, 97, 129, 130, 131, 133, 137, 145, 161, 193 |
| Parity set | 45, 50, 51, 53, 71, 74, 75, 77, 82, 83, 132, 134, 135, 138, 169, 177, 194, 195, 197, 201, 209, 225. |

* * * * *